US012614476B2

(12) United States Patent
Lim

(10) Patent No.: US 12,614,476 B2
(45) Date of Patent: Apr. 28, 2026

(54) SUPPORT BEAMS FOR CHANNEL LETTER COVERS

(71) Applicants: SDNS, Inc., Lake Forest, CA (US); Seoul Laser Dieboard System Co., Ltd., Gyeonggi-do (KR)

(72) Inventor: Kyong Chan Lim, San Diego, CA (US)

(73) Assignees: SDNS, Inc., Lake Forest, CA (US); Seoul Laser Dieboard System Co., Ltd., Gyeonggi-do (KR)

( * ) Notice: Subject to any disclaimer, the term of this patent is extended or adjusted under 35 U.S.C. 154(b) by 133 days.

(21) Appl. No.: 18/586,233

(22) Filed: Feb. 23, 2024

(65) Prior Publication Data

US 2025/0069526 A1 Feb. 27, 2025

Related U.S. Application Data

(60) Provisional application No. 63/534,754, filed on Aug. 25, 2023.

(51) Int. Cl.
*G09F 7/14* (2006.01)
*G09F 13/04* (2006.01)

(52) U.S. Cl.
CPC ............ *G09F 7/14* (2013.01); *G09F 13/0404* (2013.01)

(58) Field of Classification Search
CPC ..... G09F 7/14; G09F 13/0404; G09F 15/0012
See application file for complete search history.

(56) References Cited

U.S. PATENT DOCUMENTS 2,457,883 A * 1/1949 Fuller ........................ G09F 7/14 52/63
2,539,095 A * 1/1951 Mcmath ..................... G09F 7/14 40/616
3,396,483 A * 8/1968 Stein ................... G09F 15/0012 40/611.04
3,987,568 A * 10/1976 Rosenberg ................ G09F 7/14 411/548
2005/0005746 A1* 1/2005 Linenberger ........ G09F 13/0404 83/39
2013/0160339 A1* 6/2013 Glennon ............. G09F 15/0012 264/328.14
2014/0047747 A1* 2/2014 Jackson ................. A47G 1/065 40/730
2016/0159060 A1* 6/2016 Lim .................... B32B 37/1284 428/167
2018/0182265 A1* 6/2018 Lim .................... G09F 13/0404

* cited by examiner

*Primary Examiner* — Gary C Hoge
(74) *Attorney, Agent, or Firm* — Procopio, Cory, Hargreaves & Savitch LLP

(57) ABSTRACT

An apparatus for a profile including an upper rib and a lower rib, including: at least one support beam placed between the upper rib and the lower rib, wherein the upper rib provides a surface on which to apply adhesive to attach a front panel to the profile, wherein the at least one support beam attaches to the profile to provide an additional surface on which to apply the adhesive to attach the front panel to the profile.

16 Claims, 7 Drawing Sheets

400

500

SUPPORT BEAMS FOR CHANNEL LETTER COVERS

CROSS-REFERENCE TO RELATED APPLICATIONS

This application claims the benefit of priority under 35 U.S.C. § 119 (e) of co-pending U.S. Provisional Patent Application No. 63/534,754, filed Aug. 25, 2023, entitled "Support Beams for Channel Letter Covers." The disclosure of the above-referenced application is incorporated herein by reference.

BACKGROUND

Field of the Disclosure

The present disclosure relates to support beams, and more specifically, to support beams disposed between an upper rib and a lower rib of a profile.

Background

A letter form is formed by bending the profile using a bending machine such as a channel bender. In one example, the profile may include at least one rib including an upper rib and a lower rib. In one implementation, the letter form is attached to a wall of a building to display a signage formed from multiple letter forms.

A letter form may have an acrylic face which makes up a front panel of the signage and a back panel which enables the letter form to be attached to the wall, sometimes using a rivet. In one example, the front panel may be made of material other than acrylic face such as metallic material. In one example, the back panel may be held in place using a clip disposed around the lower rib. The front panel may be held in place using an adhesive placed around the upper rib and below the front panel. However, as the front panel gets heavier and/or bulkier, the adhesive placed around the upper rib and below the front panel may not be strong enough to hold the front panel in place. In some cases, the front panel may fall off and cause injury to person(s) below the signage or damage to properties.

SUMMARY

The present disclosure discloses support beam(s) disposed between an upper rib and a lower rib of a profile forming a letter form to provide more surface to apply adhesive to attach the front panel to the profile.

In one implementation, an apparatus for a profile including an upper rib and a lower rib is disclosed. The apparatus includes: at least one support beam placed between the upper rib and the lower rib, wherein the upper rib provides a surface on which to apply adhesive to attach a front panel to the profile, wherein the at least one support beam attaches to the profile to provide an additional surface on which to apply the adhesive to attach the front panel to the profile.

In another implementation, an apparatus for a profile is disclosed. The apparatus includes: at least one support beam attached to an inner surface of the profile, wherein the at least one support beam attaches to the profile to provide a surface on which to apply an adhesive to attach the front panel to the profile.

In a further implementation, a signage apparatus is disclosed. The signage apparatus includes: a letter form including a profile having an upper rib and a lower rib; a front panel attached to the letter form; and at least one support beam placed between the upper rib and the lower rib of the profile, wherein the upper rib provides a surface on which to apply adhesive to attach the front panel to the profile, and wherein the at least one support beam attaches to the profile to provide an additional surface on which to apply the adhesive to attach the front panel to the profile.

DETAILED DESCRIPTION

As described above, a signage formed of a letter form may have a front panel attached to the letter form. The front panel may be held in place using an adhesive placed around the upper rib and below the front panel. However, as the front panel gets heavier and/or bulkier, the adhesive placed around the upper rib and below the front panel may not be strong enough to hold the front panel in place, which may fall off and cause injury to person(s) below the signage or cause damage to properties.

Certain implementations of the present disclosure provide for support beam(s) between the upper rib and the lower rib to provide more surface to apply adhesive to the front panel. After reading the below descriptions, it will become apparent how to implement the disclosure in various implementations and applications. Although various implementations of the present disclosure will be described herein, it is understood that these implementations are presented by way of example only, and not limitation. As such, the detailed description of various implementations should not be construed to limit the scope or breadth of the present disclosure.

Figure 1A:
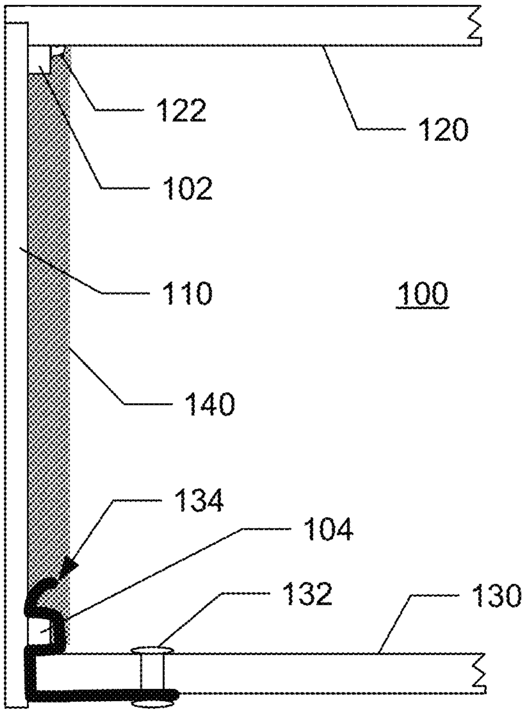
FIG. 1A shows a side cut-away view of a signage in accordance with one implementation of the present disclosure.

FIG. 1A shows a side cut-away view of a signage 100 in accordance with one implementation of the present disclosure. In the illustrated implementation of FIG. 1A, the signage 100 includes a letter form 110, a front panel 120, and a back panel 130. The signage 100 may also include an upper rib 102 and a lower rib 104 attached to the letter form 110. In one implementation, the front panel 120 enables the light from a light source disposed within the signage 100 to show through the front. In one implementation, the front panel 120 is made of acrylic material. In another implementation, the front panel 120 is made of material other than acrylic such as metallic material. In one implementation, the back panel 130 enables the signage 100 to be attached to a wall, sometimes using a rivet 132.

In the illustrated implementation of FIG. 1A, the front panel 120 is held in place (and to the letter form 110) using an adhesive 122 placed around the upper rib 102 and below the front panel 120, while the back panel 130 is held in place (and to the letter form 110) using a clip 134 disposed around the lower rib 104. As described above, as the front panel 120 gets heavier and/or bulkier, the adhesive 122 placed around the upper rib 102 and below the front panel 120 may not be strong enough the hold the front panel 120 in place. In some cases, the front panel may fall off and cause injury to person(s) below the signage or damage to properties. Accordingly, in the illustrated implementation of FIG. 1A, a support beam 140 is placed between the upper rib 102 and the lower rib 104 to provide more surface to apply the adhesive to the front panel 120.

Figure 1B:
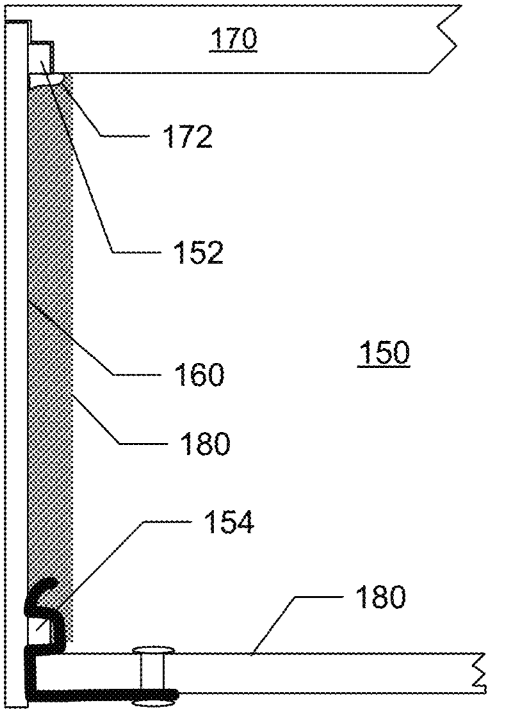
FIG. 1B shows a side cut-away view of a signage in accordance with another implementation of the present disclosure.

FIG. 1B shows a side cut-away view of a signage 150 in accordance with another implementation of the present disclosure. In the illustrated implementation of FIG. 1B, the signage 150 includes a letter form 160, a front panel 170, and a back panel 180. The signage 150 may also include an upper rib 152 and a lower rib 154 attached to the letter form 160. The implementation of the signage 150 in FIG. 1B is slightly different (than the signage 100 of FIG. 1A) in that the front panel 170 covers the upper rib 152 entirely to provide a slightly more surface to attach the front panel 170 to the letter form 160. However, the amount of adhesive 172 applied under the rib 152 and the front panel 160 still may not be strong enough to hold the front panel 170 in place without falling off from the letter form 160. Accordingly, in the illustrated implementation of FIG. 1B, a support beam 180 is placed between the upper rib 152 and the lower rib 154 to provide more surface to apply the adhesive to the front panel 170 to keep it attached to the letter form 160.

Figure 2:
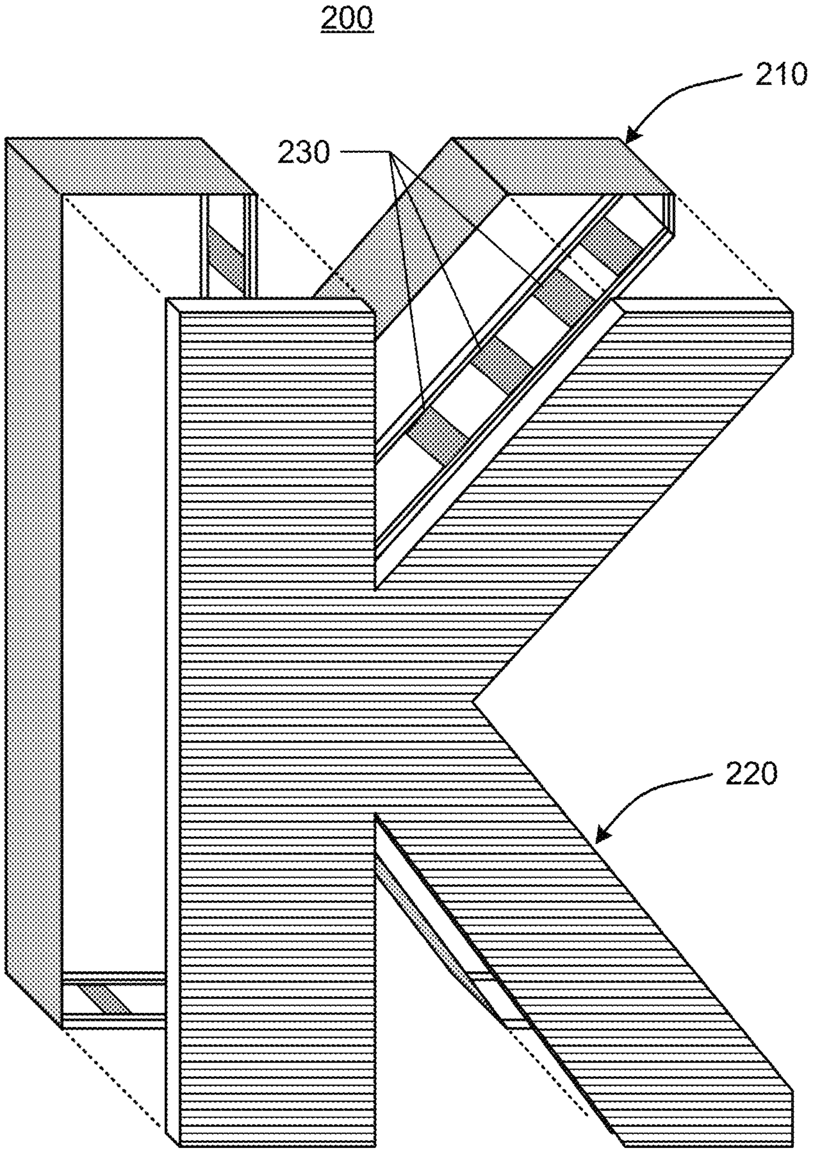
FIG. 2 shows a front perspective view of a signage in accordance with one implementation of the present disclosure.

FIG. 2 shows a front perspective view of a signage 200 in accordance with one implementation of the present disclosure. In the illustrated implementation of FIG. 2, the signage 200 (which forms a letter K) includes a letter form 210, a front panel 220, and a plurality of support beams 230. FIG. 2 shows the support beams 230 placed all around the inside of the letter form 210 to provide more surface to attach the front panel 220 to the letter form 210.

Figure 3A:
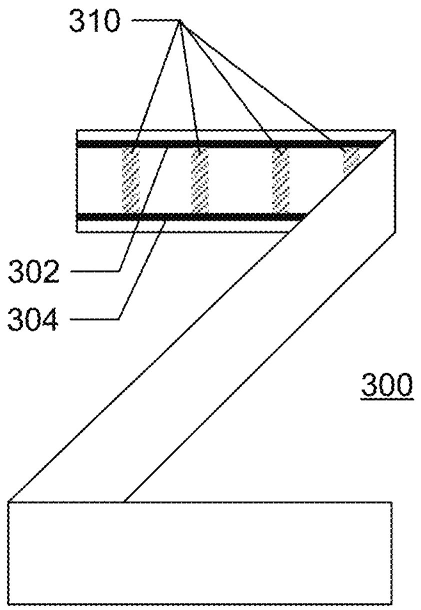
FIG. 3A shows one example of a profile forming a letter form in accordance with one implementation of the present disclosure.

FIG. 3A shows one example of a profile 300 forming a letter form in accordance with one implementation of the present disclosure. In the illustrated implementation of FIG. 3A, the profile 300 includes an upper rib 302 and a lower rib 304. In this implementation, a plurality of support beams 310 is placed between the upper rib 302 and the lower rib 304 to provide more surface to apply adhesive to the front panel. In one implementation, the support beams 310 are formed as a plastic break-off module (see FIG. 4 and FIG. 5 as examples of break-off modules) where just the right number of support beams may be broken off and attached between the upper rib and the lower rib of a profile. In other implementations, the break-off modules are formed with material other than plastic such as steel, glass, bamboo, cardboard, etc.

Figure 3B:
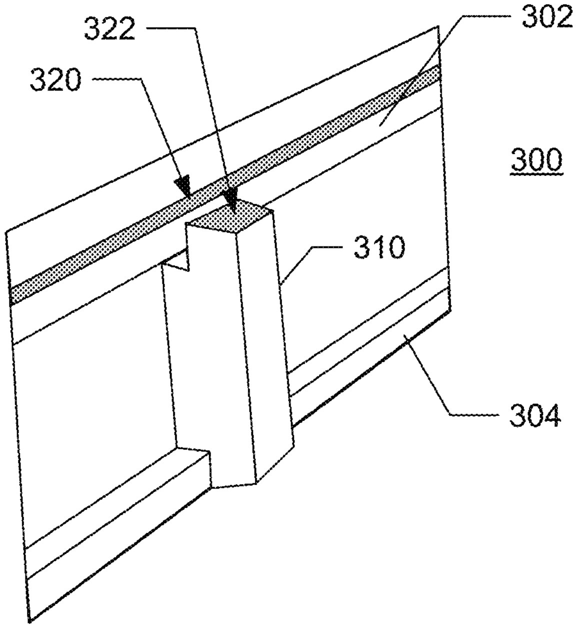
FIG. 3B shows a close-up view of the profile forming a letter form in accordance with one implementation of the present disclosure.

FIG. 3B shows a close-up view of the profile 300 forming a letter form in accordance with one implementation of the present disclosure. The illustrated implementation of FIG. 3B shows the upper rib 302, the lower rib 304, and the support beam 310 placed between the upper rib 302 and the lower rib 304. FIG. 3B shows surface 320 formed with the upper rib 302 and surface 322 formed with the support beam 310 to provide more surface to apply adhesive to attach the front panel to the profile 300 of the letter form.

Figure 4:
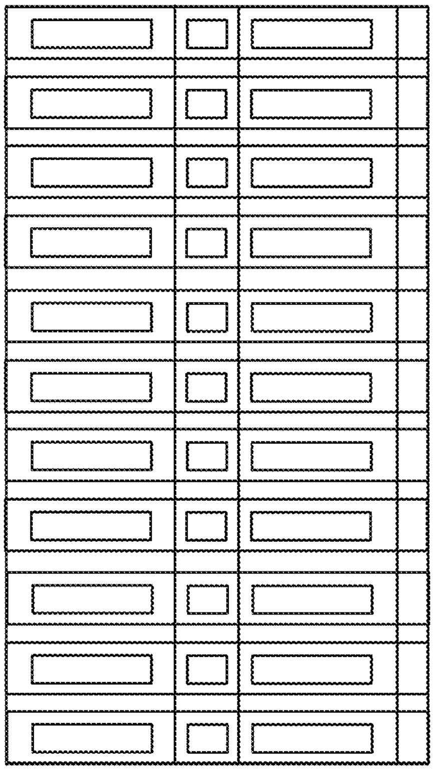
FIG. 4 shows one example design of the break-off support beams in accordance with one implementation of the present disclosure.

FIG. 4 shows one example design of the break-off support beams 400 in accordance with one implementation of the present disclosure. In FIG. 4, the break-off support beams 400 are formed as a double decker to be used for wide profiles.

Figure 5:
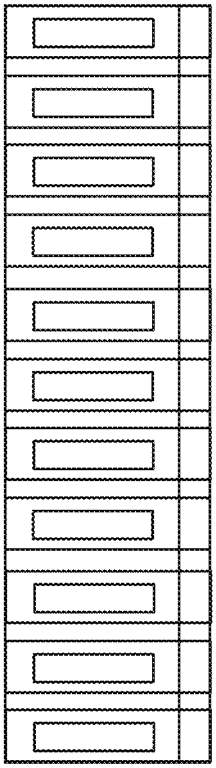
FIG. 5 shows another example design of the break-off support beams in accordance with one implementation of the present disclosure.

FIG. 5 shows another example design of the break-off support beams 500 in accordance with one implementation of the present disclosure. In FIG. 5, the break-off support beams 500 are formed as a single decker to be used for profiles with widths that are narrower than the wide profiles.

Figure 6:
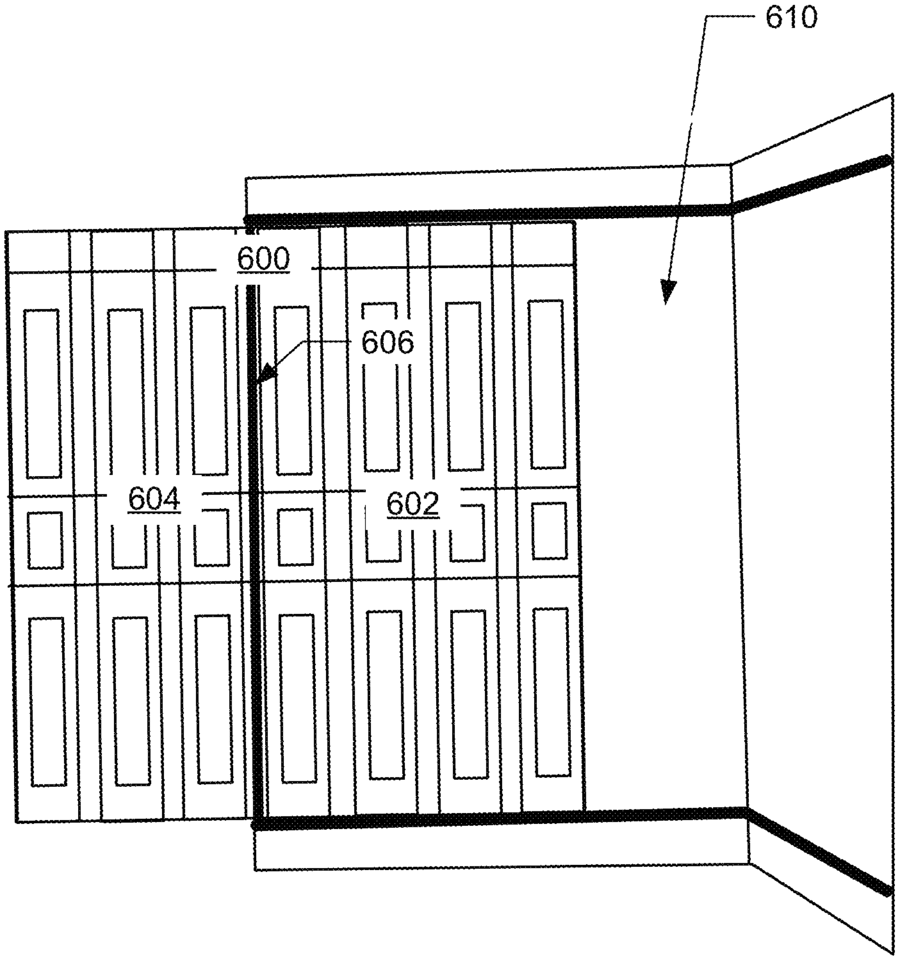
FIG. 6 shows an example of attaching a double decker break-off module to a profile in accordance with one implementation of the present disclosure.

FIG. 6 shows an example of attaching a double decker break-off module 600 to a profile 610 in accordance with one implementation of the present disclosure. In the illustrated implementation of FIG. 6, the break-off module 600 is placed between the ribs and attached to the profile 610 with adhesive. Once part 602 is securely attached to the profile 610, part 604 may be detached from part 602 by breaking off part 604 along the parting line 606.

Figure 7:
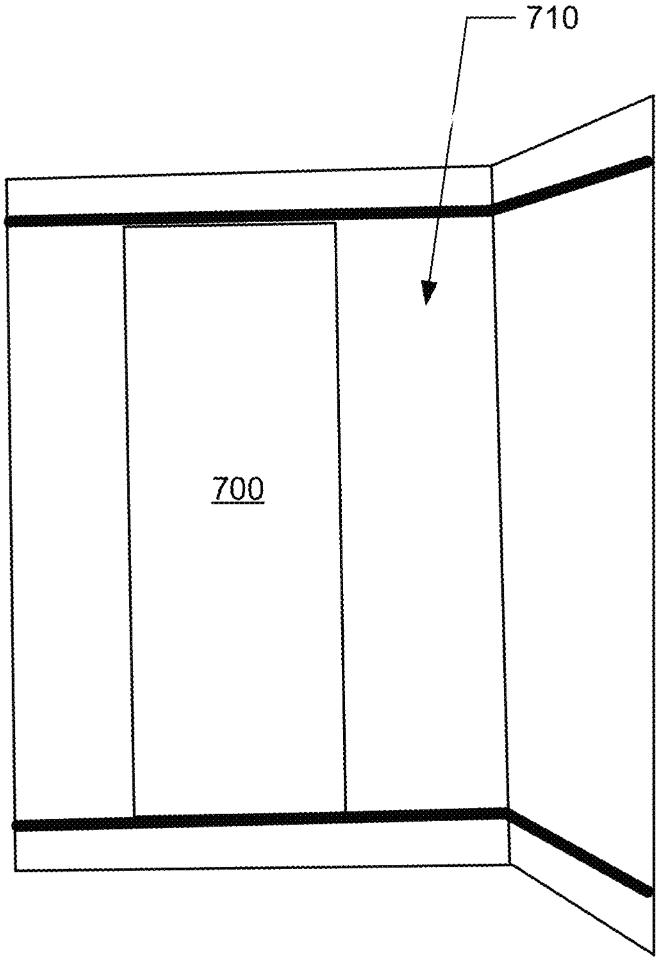
FIG. 7 shows an example a double decker break-off module attached to the surface of a profile in accordance with one implementation of the present disclosure.

FIG. 7 shows an example a double decker break-off module 700 attached to the surface of a profile 710 in accordance with one implementation of the present disclosure. In one implementation, the support beams are configured as tear-off, snap-off, or cut-off modules. In one implementation, the tear-off module may be produced with cardboard material. In another implementation, the snap-off module may be produced with plastic material in a snap-together configuration. In another implementation, the cut-off module may be produced with wooden or bamboo material and a desired width of the material may be cut to attach between the upper and lower ribs.

In one implementation, the width of the wide profile is greater than 20 inches, while the width of the narrower profile is less than or equal to 20 inches. In another implementation, the width of the wide profile is greater than 20 inches, while the narrower profile includes two types, a narrow profile and a mid-sized profile. In one implementation, the width of the mid-sized profile is between 12 inches and 20 inches, while the width of the narrow profile is less than 12 inches. In the implementation in which the profile includes 3 sizes (i.e., wide, narrow, and mid-sized), the narrow profile uses a single decker beam, the mid-sized profile uses a double decker beam, while the wide profile uses a triple decker beam.

Figure 8:
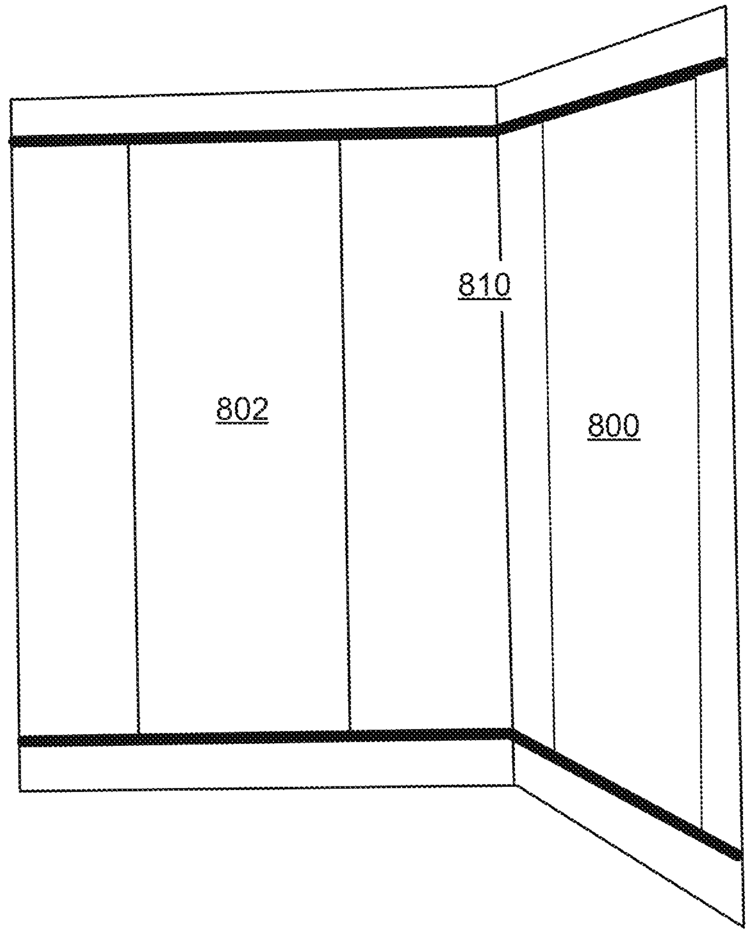
FIG. 8 is another example of the break-off modules attached to the surface of the profile between the upper rib and the lower rib.

FIG. 8 is another example of the break-off modules 800, 802 attached to the surface of the profile 810 in accordance with one implementation of the present disclosure. Although the above implementations are configured to place or dispose the support beam(s) between two ribs, the support beam(s) may be placed, disposed, or attached even without the ribs. For example, the support beam may be attached directly to the profile to provide surfaces on which adhesives can be applied to attach the front panel to the profile.

In one particular implementation, an apparatus for a profile including an upper rib and a lower rib is disclosed. The apparatus includes: at least one support beam placed between the upper rib and the lower rib, wherein the upper rib provides a surface on which to apply adhesive to attach a front panel to the profile, wherein the at least one support beam attaches to the profile to provide an additional surface on which to apply the adhesive to attach the front panel to the profile.

In one implementation, the at least one support beam is configured as a break-off module. In one implementation, the profile is a wide profile, and the break-off module is formed as a double decker to be used for the wide profile. In one implementation, the profile is a narrow profile, and the break-off module is formed as a single decker to be used for the narrow profile. In one implementation, the break-off module is formed by coupling a plurality of support beams together such that a desired number of support beams is detachable from the break-off module. In one implementation, the desired number of support beams is detached from the break-off module along a parting line. In one implementation, the break-off module is formed with plastic. In one implementation, the break-off module is formed with at least one of steel, glass, bamboo, and cardboard. In one implementation, the at least one support beam is configured as one of a tear-off, snap-off, or cut-off module. In one implementation, the tear-off module is produced with cardboard material. In one implementation, the snap-off module is produced with plastic material in a snap-together configuration. In one implementation, the cut-off module is produced with wooden or bamboo material and a desired width of material is cut to attach between the upper rib and the lower rib.

In another particular implementation, an apparatus for a profile disclosed. The apparatus includes: at least one support beam attached to an inner surface of the profile, wherein the at least one support beam attaches to the profile to provide a surface on which to apply an adhesive to attach the front panel to the profile.

In another particular implementation, a signage apparatus is disclosed. The signage apparatus includes: a letter form including a profile having an upper rib and a lower rib; a front panel attached to the letter form; and at least one support beam placed between the upper rib and the lower rib of the profile, wherein the upper rib provides a surface on which to apply adhesive to attach the front panel to the profile, and wherein the at least one support beam attaches to the profile to provide an additional surface on which to apply the adhesive to attach the front panel to the profile.

In one implementation, the profile is a part of the letter form. In one implementation, attaching the front panel to the letter form forms the signage. In one implementation, the front panel is made of acrylic material. In one implementation, the front panel is made of metallic material. In one implementation, the signage apparatus further includes a back panel to enable the signage apparatus to be attached to a wall. In one implementation, the at least one support beam is configured as a break-off module.

The descriptions herein of the disclosed implementations are provided to enable any person skilled in the art to make or use the present disclosure. Numerous modifications to these implementations would be readily apparent to those skilled in the art, and the principals defined herein can be applied to other implementations without departing from the spirit or scope of the present disclosure.

All features of each of the above-discussed examples are not necessarily required in a particular implementation of the present disclosure. Further, it is to be understood that the description and drawings presented herein are representative of the subject matter which is broadly contemplated by the present disclosure. It is further understood that the scope of the present disclosure fully encompasses other implementations that may become obvious to those skilled in the art and that the scope of the present disclosure is accordingly limited by nothing other than the appended claims.

The invention claimed is:

1. An apparatus for a profile including an upper rib and a lower rib, the apparatus comprising:

at least one support beam placed between the upper rib and the lower rib, wherein the upper rib provides a surface on which to apply adhesive to attach a front panel to the profile, wherein the at least one support beam attaches to the profile to provide an additional surface on which to apply the adhesive to attach the front panel to the profile, wherein the at least one support beam is configured as a break-off module, wherein the break-off module is formed by coupling a plurality of support beams together such that a desired number of support beams is detachable from the break-off module.

2. The apparatus of claim 1, wherein the profile is a wide profile, and the break-off module is formed as a double decker to be used for the wide profile.

3. The apparatus of claim 1, wherein the profile is a narrow profile, and the break-off module is formed as a single decker to be used for the narrow profile.

4. The apparatus of claim 1, wherein the desired number of support beams is detached from the break-off module along a parting line.

5. The apparatus of claim 1, wherein the break-off module is formed with plastic.

6. The apparatus of claim 1, wherein the break-off module is formed with at least one of steel, glass, bamboo, and cardboard.

7. An apparatus for a profile including an upper rib and a lower rib, the apparatus comprising:

at least one support beam attached to an inner surface of the profile between the upper rib and the lower rib, wherein the upper rib provides a surface on which to apply adhesive to attach a front panel to the profile, wherein the at least one support beam attaches to the profile to provide an additional surface on which to apply the adhesive to attach the front panel to the profile, wherein the at least one support beam is configured as one of a tear-off, snap-off, or cut-off module.

8. The apparatus of claim 7, wherein the tear-off module is produced with cardboard material.

9. The apparatus of claim 7, wherein the snap-off module is produced with plastic material in a snap-together configuration.

10. The apparatus of claim 7, wherein the cut-off module is produced with wooden or bamboo material and a desired width of material is cut to attach between the upper rib and the lower rib.

11. A signage apparatus, comprising:

a letter form including a profile having an upper rib and a lower rib;

a front panel attached to the letter form; and at least one support beam placed between the upper rib and the lower rib of the profile, wherein the upper rib provides a surface on which to apply adhesive to attach the front panel to the profile, wherein the at least one support beam attaches to the profile to provide an additional surface on which to apply the adhesive to attach the front panel to the profile, wherein the at least one support beam is configured as a break-off module, wherein the break-off module is formed by coupling a plurality of support beams together such that a desired number of support beams is detachable from the break-off module.

12. The signage apparatus of claim 11, wherein the profile is a part of the letter form.

13. The signage apparatus of claim 12, wherein attaching the front panel to the letter form forms the signage.

14. The signage apparatus of claim 11, wherein the front panel is made of acrylic material.

15. The signage apparatus of claim 11, wherein the front panel is made of metallic material.

16. The signage apparatus of claim 11, further comprising a back panel to enable the signage apparatus to be attached to a wall.

* * * * *